July 18, 1967

H. W. PROCTOR 3,331,974

STEPPING MOTOR WITH A FLEXIBLE ROTOR

Filed Nov. 4, 1964

*Inventor*
Herbert W. Proctor
By his Attorney

Carl E. Johnson.

United States Patent Office 3,331,974
Patented July 18, 1967

3,331,974
STEPPING MOTOR WITH A FLEXIBLE ROTOR
Herbert W. Proctor, Danvers, Mass., assignor to United Shoe Machinery Corporation, Flemington, N.J., a corporation of New Jersey
Filed Nov. 4, 1964, Ser. No. 409,001
6 Claims. (Cl. 310—49)

ABSTRACT OF THE DISCLOSURE

An electromagnetic rotary actuator, especially of the stepping type, employing in coaxial relation, a deflectible rotor, and a stator including pairs of circumferentially adjacent poles providing localized circumferential magnetic circuits respectively including a portion of the rotor, the main flux paths of the circuits being respectively short and localized circumferentially in the deflected rotor, and selected, angularly spaced pairs of the poles being simultaneously energized sequentially to deflect and drive the rotor.

Background of the invention

This invention relates to electric motors, and more especially to the variable reluctance type of stepping motor wherein energization by DC voltage in a programmed manner produces angular indexing with precision. As herein shown and explained the invention is embodied in a form wherein a novel stator winding, when sequentially pulsed, effects an electromagnetic field which reacts, in solenoid fashion, on a tubular rotor which is radially deflectible. The latter is employed to propagate a circumferential wave directly convertible to reduced rotary output speed. Although the invention is illustrated in a specific embodiment, it will be understood that application of the invention is not thus limited.

Servo positioning devices are finding wide usage in such fields as digital computers, valve actuators, tape transporters, and process control, to name but a few. Variable reluctance, stepping servo motors are especially advantageous because of the ease with which small angular steps are obtained and because of their ability to run bi-directionally and at high pulse rates. In a copending application, Ser. No. 258,707, filed Feb. 15, 1963, in the names of Willard B. Spring, et al. (now Patent No. 3,169,201), there is disclosed a high response, low inertia stepping motor having unique features of construction. As therein illustrated an actuator of the so-called harmonic drive type employs a conventional distributed-winding stator producing a traveling, radially acting solenoid effect on a radially deflected armature. Thus, in response to pulse energization, radial force of the magnetic field is converted to rotary output, with reduced speed and amplified torque, in small steps of high precision. While such units have been found highly satisfactory in performance, it is recognized that a simpler construction affording a different and better flux path and lower cost without loss in efficiency is particularly desirable.

Summary of the invention

It accordingly is a principal object of this invention to provide an improved, high response type rotary actuator having a low cost stator winding capable of progressively deflecting portions of a rotor, the stator inducing angularly spaced, circumferentially localized flux paths in the rotor to produce precision angular stepping.

A further and more specific object of the invention is to provide, in a stepping motor of the type employing a radially deflectible armature, an economical stator productive of flux paths insuring more effective operation and with stepping rates from zero to about twelve hundred steps per second.

To these ends and in accordance with a feature of the invention, there is provided a high response actuator comprising a low inertia deflectible rotor, and a multipole stator for deflecting and controlling the rotor, the stator having a winding for simultaneously pulsing selected, angularly spaced magnetic circuits including, respectively, a pair of poles and an adjacent circumferential spanning portion of the rotor, in sequence. By means of this arrangement the adjacent pairs of stator poles are progressively pulsed to pass flux in simple, circumferential, but not wholly discrete circuits which respectively include only localized, i.e. circumferential magnetic shoe portions of the rotor. Also, as illustrated in an embodiment employing a radially deflectible armature (either with or without tooth formation), the novel stator winding effectively shapes the armature elliptoidally and circumferentially propagates such shape, acting sequentially to pass flux mainly through circumferentially localized, diametrically opposite portions (spaced 120° apart when 3 lobe deflection is employed) of the armature rather than through discrete, axial portions of an armature as disclosed in the above cited Spring et al. patent.

Brief description of the drawing

Figure 1:
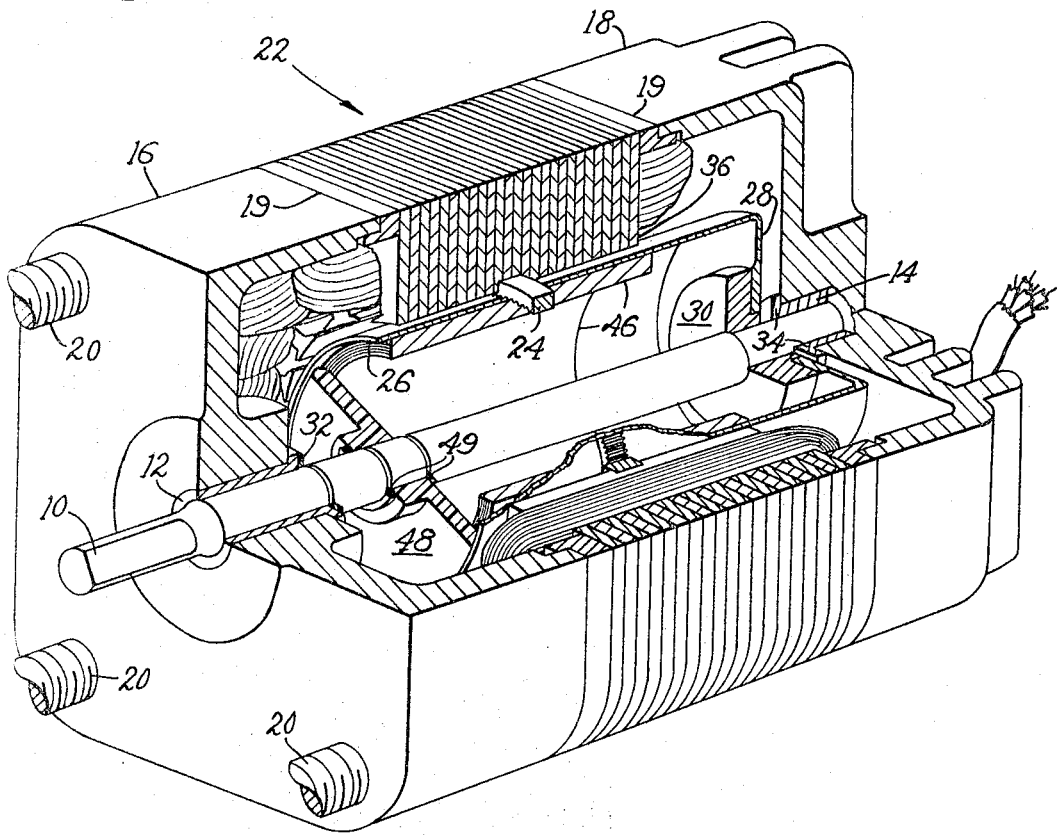
FIG. 1 is a perspective view of a high response, rotary actuator incorporating a novel stator winding circuit, a quarter section being removed to reveal internal structure including a deflectible rotor.

The foregoing and other features of the invention, together with novel details and combinations of parts, will now be described with greater particularity in connection with the illustrative embodiments thereof and with reference to the drawings, in which:

An output shaft 10 is journaled in axially spaced bushing bearings 12, 14 respectively mounted in housing end caps 16, 18. These caps are secured in clamping relation by means of spacers 19, 19 and bolts 20 to a laminated stator generally designated 22, later to be described in detail. In the arrangement of FIG. 1, a reaction or circular spline 24 (which may be of metal or a durable plastic) coaxial with the shaft 10 is internally formed with axial spline teeth and anchored to the stator. As shown in FIG. 4, an alternative construction permits elimination of the circular spline 24 as such, its teeth being formed directly on stator pole faces. For cooperating with the circular spline 24 a rotor or armature coaxial therewith, in this case a thin-walled, tubular metal flexspline 26 (FIG. 1), has its closed end 28 bored to receive the shaft 10, a collar 30 integral with the shaft being secured to the end 28 as by adhesive. In conformity with general operating principles of harmonic drive gearing, as disclosed for example in United States Letters Patent No. 2,906,143, issued Sept. 29, 1959, in the name of C. W. Musser, as well as in the Spring et al. patent above cited, the number of teeth on the inner member, i.e. the flexspline in this case, is less by two or a multiple thereof when deflection of the flexspline 26 to elliptoidal shape is practiced. A retaining ring 32 (FIG. 1) seated in a groove of the shaft 10 abuts the bearing 12 to prevent relative endwise movement of the shaft 10 in one direction, and a flange 34 of the bearing 14 prevents relative axial movement of the shaft in the opposite direction.

Figure 2:
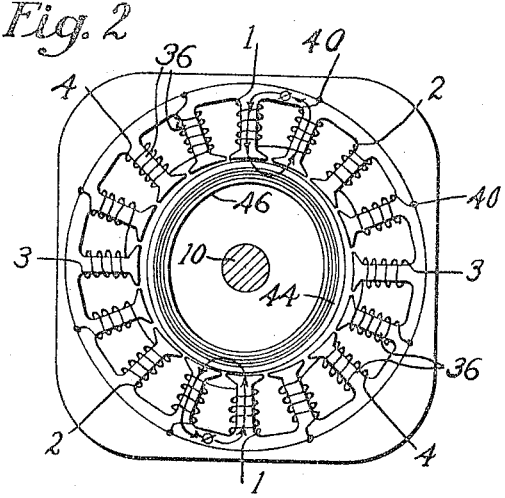
FIG. 2 is a transverse section illustrating the stator winding of FIG. 1 and a pair of its flux paths acting diametrically on a toothless or flextube rotor in lieu of the flexspline type rotor shown in FIG. 1.
Figure 3:
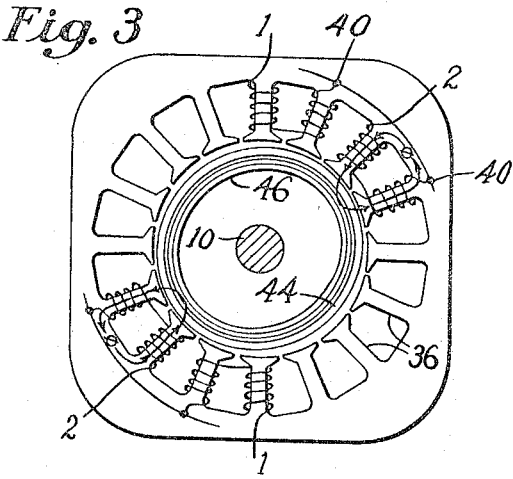
FIG. 3 is a view similar to FIG. 2 except that input pulsing has been stepped to the next pairs of stator poles.
Figure 5:
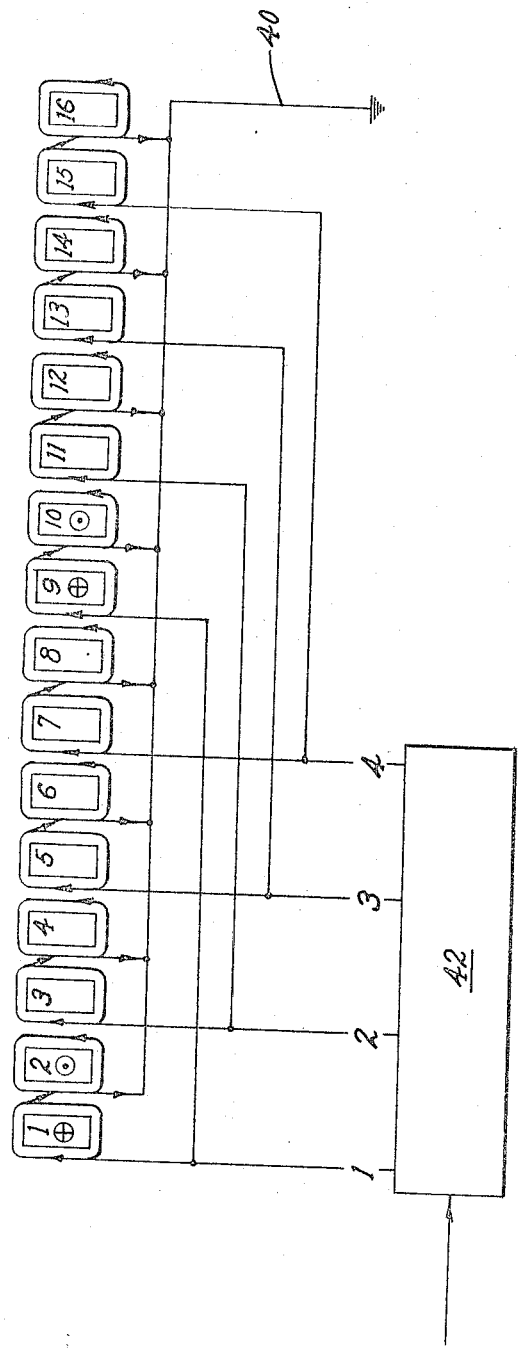
FIG. 5 is an electrical diagram of the stator winding shown in FIGS. 1 through 4.
Figure 6:
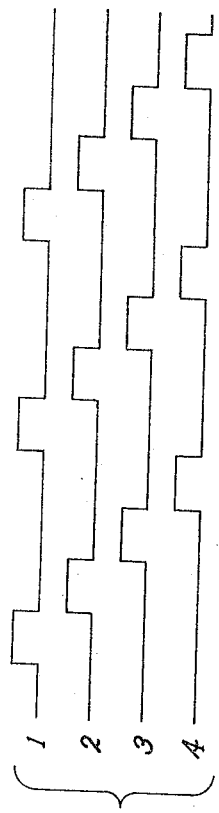
FIG. 6 is a schematic diagram of the input pulse distribution for the illustrative 16 stator pole arrangement.
Figure 7:
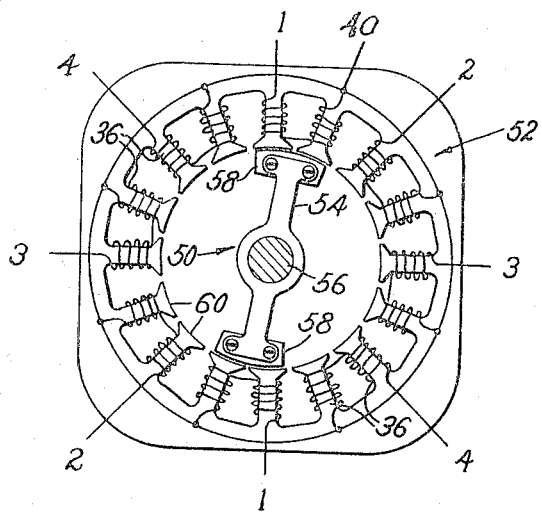
Figure 8:
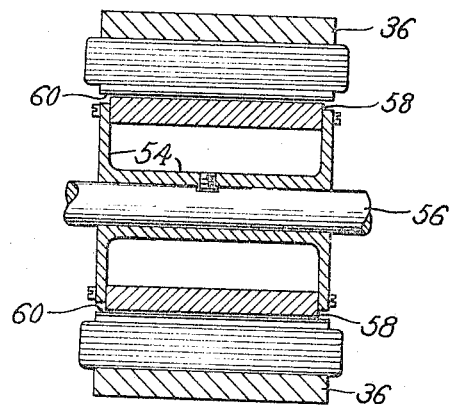
Figure 9:
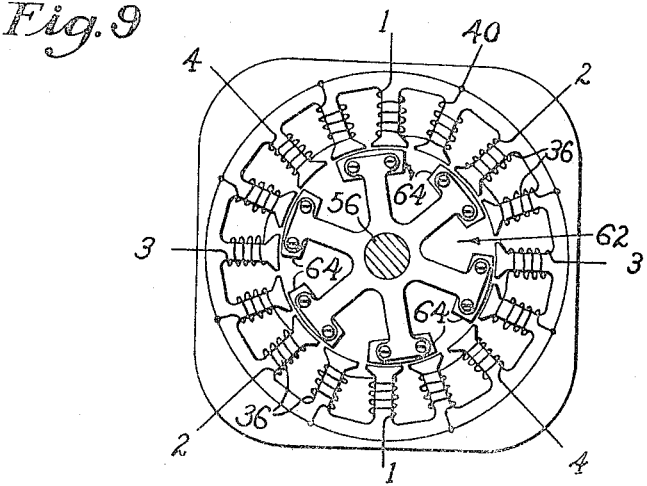

It is the function of the stator 22 radially to deflect the flexspline teeth into elliptoidal configuration, and also to circumferentially propagate the resulting wave of radial deflection thereby advancing the spaced localities of tooth interengagement of the circular and flexible splines. The stator 22 comprises a plurality of laminations arranged side-by-side and coated in conventional manner to provide insulation therefor. These may be individually stamped out in identical configuration and formed with equi-spaced, internally and diametrically disposed cores 36, respectively having arcuate pole faces. The number of poles provided will depend on the selected pulsing sequence of an input circuit. In general, the number of poles will be equal to four times the pulsing sequence. Thus if, as shown herein in FIG. 6, the input is a 4-pulse train, the number of poles employed is 16 as indicated in FIG. 5 (in a 3-pulse train the number of poles would be 12, and in a 5-pulse train the stator would have 20 poles). In a conventional field winding the flux passing through the cores divides, both on reaching the main body of stator laminations and on reaching the armature, and in the disclosure of the above cited Spring et al. patent the main flux paths extend axially in discrete magnetic circuits through armature laminations. In contrast thereto the stator 22 provides short circumferential flux paths localized to the energized, diametrically opposed pairs of adjacent cores 36 and a circumferential adjacent portion of the rotor. For this purpose each successive pair of adjacent cores 36 is wound in series to provide alternately north and south poles as shown in FIGS. 2, 3 and 5. Thus an input lead 1 (FIGS. 2, 3, 5) is coiled about one core 36 and then is continued in a coil oppositely wound about an adjacent core 36 before being connected, like the remaining field windings, to a common current return or ground line 40 (FIGS. 2, 3 and 5). As indicated in FIG. 5, where the cores are successively numbered from 1-16 inclusive, input from the lead 1 of a pulse distributing network or ring counter 42 is simultaneously directed to the core 1 and its diametrically opposed core 9; input from the lead 2 (FIGS. 5 and 6) is next directed to the opposite cores 3 and 11; etc. The four input leads from the ring counter 42 are thus pulsed sequentially as indicated in FIG. 6 to circumferentially energize in successive steps the diametrically opposed, adjacent pairs of cores.

It is to be noted, for instance with reference to FIG. 2, that pulsing of the leads 1 creates localized, diametrically opposed magnetic circuits respectively passing circumferentially through the adjacent cores and an adjacent spanning portion of a rotor, in this case a toothless flex tube 44, each flux path being localized circumferentially in the tube. The next pulse from the ring counter 42, as energization of the leads 1 ceases, goes to the leads 2 and thereby progressively steps the localized, main flux loops from their positions indicated in FIG. 2 to those shown in FIG. 3. While the axially disposed flux loops in the mentioned Spring et al. patent were diametrically opposite and almost wholly discrete, it is to be observed that in the present invention the arrangement is such that the main, diametrically opposed flux paths are closed but extend circumferentially, and there is a localized secondary flux path providing a magnetic force exerted circumferentially beyond the main flux paths, for instance from the now energized coils of the leads 2 to act circumferentially on those portions of the rotor under the de-energized portions of the leads 1. This distinction is important to an appreciation of the smoother and more effective performance insured by the present invention.

As disclosed in copending application Ser. No. 258,734, filed Feb. 15, 1963 in the names of Herbert W. Proctor, et al. (now patent No. 3,169,202) a synchronous type actuator embodying a deflectible armature may advantageously include a closely wound coil of thin, flat magnetic material such as shim stock, sometimes referred to as a "clock spring." It is preferred in the present invention to have the flexspline 26 or the flex tube 44, as the case may be, similarly backed by a clock spring type coil 46 of magnetic shim stock. This construction permits the armature to retain its radial flexibility and reduces detrimental reluctance. To prevent unwinding or relative rotation of the coil 46, it is secured at diametrically opposite points, as by electronic beam welding, to the flex tube or flexspline.

It has been found that, when an elliptoidal rotor 26 or 44 is operating under load, there is sometimes encountered a tendency, due to perhaps minor machining eccentricities or inherent stresses in materials, for the 2-lobed rotor 26 or 44 to become single-lobed. This transition to a non-symmetric state preferably is to be guarded against, since if teeth are employed, ratcheting may then be incurred. Whether teeth are employed or not, if the elliptoidal rotor is allowed to shift to its non-symmetric or D-shaped section, a reduced load capability may result. To prevent this condition from arising there preferably is provided a circular, deflection-limiting disk 48 (FIG. 1) having a rounded periphery to provide line contact with the interior of the flex tube or flexspline, the expected minimum internal minor diameter of the latter when 2-lobed being only very slightly larger than the disk diameter. The disk 48, which incidentally may desirably be of nylon, is retained axially by rings 49, 49 on the shaft to hold the disk against an end of the coil 46.

Figure 4:
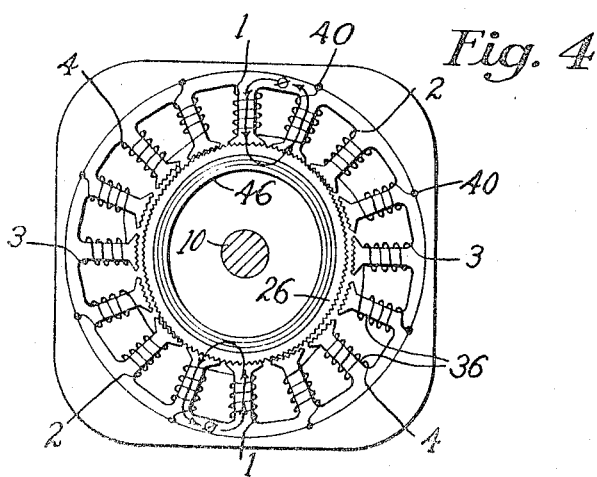
FIG. 4 is a view similar to FIGS. 2 and 3 except that the rotor is now in the form of a tubular flexspline cooperative with spline teeth formed on the stator poles.

As has been indicated the spline teeth may be omitted altogether as indicated in FIGS. 2 and 3, or they may be formed directly on the stator pole faces as shown in FIG. 4. It is significant to note that, with or without spline teeth, the present invention causes greatly reduced surface stress in the deflected rotor as compared with that incurred in the extended contact design provided by the synchronous version disclosed in the cited Proctor et al. Patent No. 3,169,202.

Operation of the device of FIGS. 1 to 4 inclusive is believed clear from the foregoing. Sequential input pulses from the ring counter 42 are progressively directed to the leads 1, 2, 3 and 4 to energize diametrically opposite, adjacent pairs of cores 36, 36. Each pair as energized provides a main path of flux which passes circumferentially through an adjacent peripheral portion of the deflectable armature 26 which, in the manner of magnetic material, endeavors to shorten the flux path and hence moves closer to the energized pole faces. The major diameter of the armature is then caused to be rotated an increment by de-energizing the two diametrically opposed pairs of poles and energizing the next two diametrically opposed pairs of poles. This is effected, of course, by the ring counter 42 or any suitable pulse distributing means. An important distinction and advantage of the unique stator arrangement is that not only the main flux loops, as represented in FIGS. 2 and 3, extend circumferentially to propagate the circumferential wave of radial deflection in the rotor, but any less concentrated or incidental flux also produced at the energized coils acts to assist in stepping the rotor without any opportunity for the latter to lose its deflected shape. It will be apparent that the devices are bi-directional as determined by the pulse sequence. Clearly, too, the winding is of a repeating type which facilitates assembly.

While the invention has been illustrated and explained as applied for effecting and propagating elliptoidal rotor shapes, it will be understood that in principle it may also be applied to shape and drive radially deflectible rotors having three or more equi-spaced lobes and respectively having three or more circumferentially spaced localities of engagement. The selected pairs of poles simultaneously energized in sequence, in the case of 3-lobe rotors, would be spaced about 120° apart.

It will also be understood that, although the deflectible rotor 26 is herein illustrated as disposed within a circular spline or reaction member 24, the invention is not limited to this particular arrangement; the "inside out" configuration known in harmonic drive mechanism (as set forth for instance in United States Letters Patent No. 2,906,143, issued upon an application filed in the name of C. Walton Musser) may also prevail, i.e. the circular spline or reaction ring may be disposed coaxially within the deflectible rotor 26. Furthermore, the armature which provides the return path for the flux of the stator 22 may be located either internally or externally of the flexible member, and may therefore cause the engagements between the flexible member and the reaction member to occur at points of application of magnetic force, or at points approximately midway between those points of application of magnetic force. This is to say that the magnetically acting forces may act radially inward or radially outward to provide the circumferentially spaced localities of contact. Moreover, the flexible magnetic material 46 or its equivalent may be disposed either on the inside or the outside of the flexible member 26 as found desirable or convenient in a particular assembly.

Having thus described my invention, what I claim as new and desire to secure by Letters Patent of the United States is:

1. A stepping motor comprising a deflectible rotor and a stator in coaxial relation, the stator including a plurality of pairs of circumferentially adjacent poles adapted to deflect the rotor, the adjacent stator poles being of opposite magnetic polarity to provide a localized circumferential magnetic circuit including a deflectible portion of the rotor, the flux paths of said circuits being localized circumferentially to the energized poles and adjacently in said deflectible rotor, and selected equi-angularly spaced, adjacent pairs of poles being sequentially connected for simultaneous energization by the respective input leads of a current distributing network to deflect and step the rotor.

2. In a stepping motor, a radially flexible rotor, a stator including an even number of pole pairs arranged coaxially with the rotor, and a field winding comprising a plurality of input lines, each of said input lines being oppositely wound around a first adjacent pole pair and an adjacent pair opposite the first pair, and means for sequentially energizing said field input lines to cause the pole pairs to elliptoidally deflect the rotor and to step the rotor by oppositely disposed flux paths which circumferentially pass, respectively, through short circumferentially extending portions thereof.

3. In a stepping motor of the type employing a radially deflectible tubular armature, a multi-pole laminated stator for electromagnetically deflecting the armature to elliptoidal shape, and circuit means for sequentially energizing the stator poles and propagating said shape to rotate the armature, the stator including circumferentially adjacent pairs of poles coaxially disposed relative to the armature, and the circuit means including a winding about the cores of the adjacent pole pairs, respectively, and a pulse distributing network for sequentially energizing simultaneously a pair of magnetic circuits respectively comprising the cores of diametrically opposed adjacent pole pairs and a circumferential deflected armature portion spanned by said pole pairs whereby localized circumferential flux paths are induced.

4. A motor as set forth in claim 3 wherein an armature is provided with a closely wound flexible coil of magnetic material, turns of the coil being secured against unwinding, diametric portions of the coil being progressively responsive to the sequential core energization to facilitate circumferential flux passage in diametrically opposite, localized portions of the tubular armature.

5. A motor as set forth in claim 3 wherein the armature is a flexspline having teeth engageable at circumferentially spaced localities with teeth formed on a reaction circular spline coaxial therewith.

6. A motor as set forth in claim 3 wherein the armature is a flexspline having teeth engageable at circumferentially spaced localities with teeth formed on faces of the stator poles.

References Cited

UNITED STATES PATENTS

| | | | |
|---|---|---|---|
| 2,424,843 | 6/1947 | Owsley | 310—49 |
| 2,477,993 | 8/1949 | Lewis | 310—49 |
| 2,627,040 | 1/1953 | Hansen | 310—49 |
| 2,851,620 | 9/1958 | Hausen | 310—49 |
| 2,982,872 | 5/1961 | Fredrickson | 310—49 |
| 3,127,548 | 3/1964 | Emden | 310—49 |
| 3,148,319 | 9/1964 | Fredrickson | 310—49 |
| 3,169,201 | 2/1965 | Spring | 310—49 |
| 3,169,202 | 2/1965 | Proctor | 310—49 |

FOREIGN PATENTS 932,379  1/1956  Germany.

MILTON O. HIRSHFIELD, *Primary Examiner.*

J. W. GIBBS, *Assistant Examiner.*